US012583963B2

(12) United States Patent
Han et al.

(10) Patent No.: US 12,583,963 B2
(45) Date of Patent: Mar. 24, 2026

(54) POLYMERIZABLE COMPOSITION AND OPTICAL MATERIAL USING THE SAME

(71) Applicant: SK pucore co., ltd., Ulsan (KR)

(72) Inventors: Hyuk Hee Han, Gyeonggi-do (KR); Eui Jun Choi, Gyeonggi-do (KR); Kyeong Hwan You, Gyeonggi-do (KR); Jung Hwan Myung, Gyeonggi-do (KR); Jae Young Pai, Gyeonggi-do (KR); Jeong Moo Kim, Gyeonggi-do (KR); Jung Hwan Shin, Gyeonggi-do (KR)

(73) Assignee: SK pucore co., LTD., Ulsan (KR)

(*) Notice: Subject to any disclaimer, the term of this patent is extended or adjusted under 35 U.S.C. 154(b) by 855 days.

(21) Appl. No.: 17/751,863

(22) Filed: May 24, 2022

(65) Prior Publication Data

US 2022/0389147 A1     Dec. 8, 2022

(30) Foreign Application Priority Data

May 28, 2021   (KR) ........................ 10-2021-0068704
Mar. 29, 2022   (KR) ........................ 10-2022-0038552

(51) Int. Cl.

| | |
|---|---|
| *C08G 18/38* | (2006.01) |
| *C08G 18/24* | (2006.01) |
| *C08G 18/72* | (2006.01) |
| *C08G 18/73* | (2006.01) |
| *C08G 18/75* | (2006.01) |
| *G02B 1/04* | (2006.01) |

(52) U.S. Cl.
CPC ......... *C08G 18/3876* (2013.01); *C08G 18/73* (2013.01); *C08G 18/757* (2013.01)

(58) Field of Classification Search
None
See application file for complete search history.

(56) References Cited

U.S. PATENT DOCUMENTS

| | | | |
|---|---|---|---|
| 8,420,718 B2 | 4/2013 | Ando et al. | |
| 2012/0225274 A1 | 9/2012 | Ishikawa et al. | |
| 2019/0202968 A1* | 7/2019 | Shim ........................ | G02B 1/04 |

FOREIGN PATENT DOCUMENTS

| | | | | |
|---|---|---|---|---|
| CN | 109575217 A | * | 4/2019 | .......... C08G 18/242 |
| JP | 1997-208651 A | | 8/1997 | |
| KR | 10-2005-0008131 A | | 1/2005 | |
| KR | 10-2012-0076329 A | | 7/2012 | |
| KR | 10-2015-0065793 A | | 6/2015 | |
| KR | 10-2017-0046763 A | | 5/2017 | |
| KR | 2019036837 A | * | 4/2019 | ............. B29D 11/00 |
| WO | WO-2010128770 A2 | * | 11/2010 | ......... C08G 18/3876 |

OTHER PUBLICATIONS

Office Action for Philippines Patent Application No. 1/2022/050222 issued by the Intellectual Property Office of the Philippines on Sep. 19, 2024.
Office Action for the Chinese Patent Application No. 202210577967.0 issued by the Chinese Patent Office on Oct. 17, 2023.

* cited by examiner

*Primary Examiner* — Ha S Nguyen

(74) *Attorney, Agent, or Firm* — IP&T GROUP LLP

(57) ABSTRACT

A polymerizable composition according to an embodiment includes a first polymerizable compound including isophorone diisocyanate and hexamethylene diisocyanate, and a second polymerizable compound including 4-mercaptomethyl-3,6-dithia-1,8-octanedithiol and pentaerythritol tetrakis(mercaptoacetate). An optical material which is fabricated from the polymerizable composition and has improved optical, mechanical and thermal properties is provided.

12 Claims, No Drawings

POLYMERIZABLE COMPOSITION AND OPTICAL MATERIAL USING THE SAME

CROSS-REFERENCE TO RELATED APPLICATION

This application claims priority to Korean Patent Application No. 10-2021-0068704 filed on May 28, 2021 and 10-2022-0038552 filed on Mar. 29, 2022 in the Korean Intellectual Property Office (KIPO), the entire disclosure of each of the foregoing applications is incorporated by reference herein.

BACKGROUND

1. Field

The present invention relates to a polymerizable composition and an optical material using the same. More particularly, the present invention relates to a polymerizable composition including a thiol-based compound and an isocyanate-based compound, and an optical material using the same.

2. Description of the Related Art

Plastic optical materials are light-weighted compared to inorganic optical materials such as glass, and have enhanced mechanical properties, dyeability and processability. Thus, the plastic optical materials are widely used in optical products such as a spectacle lens and a camera lens. Examples of the plastic optical material include acrylic resin, polycarbonate, polythiourethane, etc., and polythiourethane-based compounds are widely used as optical materials due to improved optical and mechanical properties.

The polythiourethane-based compound may be prepared by reacting an isocyanate-based compound and a polythiol-based compound. Properties of the isocyanate-based compound and the polythiol-based compound used as raw materials may affect quality of an optical material product.

For example, polythiourethane-based compounds having different structures may be synthesized according to the number and positions of functional groups in the isocyanate-based compound and the polythiol-based compound. Further, yellowing, clouding or optical non-uniformity may occur depending on reactivity of the isocyanate-based compound and the polythiol-based compound.

Accordingly, development of an optical material capable of providing mechanical and optical properties suitable for a desired optical product is required. For example, Korean Published Patent Application No. 10-2012-0076329 discloses a urethane-based optical material prepared using an isocyanate-based compound.

SUMMARY

According to an aspect of the present invention, there is provided a polymerizable composition having improved optical and mechanical properties.

According to an aspect of the present invention, there is provided an optical material having improved optical and mechanical properties.

In exemplary embodiments, a polymerizable composition includes a first polymerizable compound including isophorone diisocyanate and hexamethylene diisocyanate, and a second polymerizable compound including 4-mercaptomethyl-3,6-dithia-1,8-octanedithiol and pentaerythritol tetrakis(mercaptoacetate).

In some embodiments, an amount of isophorone diisocyanate may be in a range from 30 parts by weight to 55 parts by weight, and an amount of hexamethylene diisocyanate may be in a range from 5 parts by weight to 20 parts by weight, based on 100 parts by weight of the first polymerizable compound and the second polymerizable compound.

In some embodiments, an amount of 4-mercaptomethyl-3,6-dithia-1,8-octanedithiol is in a range from 30 parts by weight to 45 parts by weight, and an amount of pentaerythritol tetrakis(mercaptoacetate) is in a range from 5 parts by weight to 20 parts by weight, based on 100 parts by weight of the first polymerizable compound and the second polymerizable compound.

In some embodiments, a weight ratio of 4-mercaptomethyl-3,6-dithia-1,8-octanedithiol relative to pentaerythritol tetrakis(mercaptoacetate) may be in a range from 1 to 6.

In some embodiments, a weight ratio of isophorone diisocyanate relative to hexamethylene diisocyanate may be in a range from 1 to 9.

In some embodiments, a content of sulfur represented by Equation 1 may be 24% or more:

$$((\text{a total weight of sulfur atoms contained in the second polymerizable compound})/(\text{a total weight of the first polymerizable compound and the second polymerizable compound})) \times 100. \quad \text{[Equation 1]}$$

In some embodiments, the composition may further include at least one selected from the group consisting of an internal release agent, a polymerization initiator, a heat stabilizer, an ultraviolet absorber and a blueing agent.

In some embodiments, the content of the polymerization initiator may be in a range from 500 ppm to 3,000 ppm based on a total weight of the polymerizable composition.

In some embodiments, a content of the internal release agent may be in a range from 500 ppm to 1,500 ppm based on the total weight of the polymerizable composition.

In exemplary embodiments, an optical material includes a polythiourethane resin prepared from the polymerizable composition of claim 1.

In some embodiments, a solid-state refractive index ($nd20$) at 20° C. may be in a range from 1.59 to 1.61.

In some embodiments, a glass transition temperature (Tg) may be a range from 105° C. and 120° C.

In some embodiments, a coefficient of thermal expansion (CTE) measured at a heating rate of 10° C./min using a thermomechanical analyzer (TMA) may be 78 μm/m·° C. or less.

In some embodiments, a storage modulus at 25° C. may be in a range from of 3.0 GPa to 4.0 GPa.

According to exemplary embodiments of the present invention, a polymerizable composition may include different types of isocyanate compounds and different types of polythiol compounds. Accordingly, a cured product of the polymerizable composition and an optical material prepared therefrom may have improved optical properties, heat resistance and impact resistance.

According to exemplary embodiments, the polymerizable composition may include an isocyanate compound including isophorone diisocyanate and hexamethylene diisocyanate, and a polythiol compounds including 4-mercaptomethyl-3, 6-dithia-1,8-octanedithiol and pentaerythritol tetrakis(mercaptoacetate). In this case, the composition may have enhanced polymerizable properties and reaction stability, and the optical material having improved heat resistance and impact resistance may be obtained while suppressing striation and clouding.

Additionally, the isocyanate compound and the polythiol compound may be included in the composition with predetermined content ranges and weight ratio range. Thus, a storage modulus and a glass transition temperature of the cured product may be controlled within a predetermined range, and the impact resistance, heat resistance and molding properties of the optical material may be improved.

DETAILED DESCRIPTION OF THE EMBODIMENTS

According to exemplary embodiments of the present invention, a polymerizable composition that includes a first polymerizable compound including a plurality of isocyanate compounds, and a second polymerizable compound including a plurality of polythiol compounds is provided.

According to exemplary embodiments, an optical material formed using the polymerizable composition and having improved refractive index, heat resistance and storage modulus is also provided.

Hereinafter, the present invention will be described in detail with reference to embodiments provided herein. However, those skilled in the art will appreciate that such embodiments described are provided to further understand the spirit of the present invention and do not limit subject matters to be protected as disclosed in the detailed description and appended claims.

<Polymerizable Composition>

The polymerizable composition according to exemplary embodiments may include a first polymerizable compound including different types of isocyanate compounds of different structures and a second polymerizable compound including different types of polythiol compound of different structures.

For example, the polymerizable composition may include the first polymerizable compound including an alicyclic isocyanate compound and a linear or branched aliphatic isocyanate compound; and a second polymerizable compound including a trifunctional polythiol compound having at least one sulfide group and a tetrafunctional polythiol compound having at least one ester group.

According to exemplary embodiments, the first polymerizable compound may include isophorone diisocyanate and hexamethylene diisocyanate. For example, the first polymerizable compound may be a mixture of isophorone diisocyanate and hexamethylene diisocyanate.

The polymerizable composition may include isophorone diisocyanate having an alicyclic structure in a molecular structure thereof, so that an optical material prepared therefrom may have enhanced heat resistance. Accordingly, deformation and cracks of the optical material due to a high-temperature process may be prevented. For example, a polymer formed from the polymerizable composition may have a cyclohexyl moiety providing improved structural stability in a molecular structure, and thus may have enhanced durability with respect to harsh external environment such as a high temperature and a physical impact.

Further, the polymerizable composition may include hexamethylene diisocyanate, so that bubbles may be prevented from being generated when curing of the polymerizable composition, and an impact strength of the optical material may be improved. Accordingly, clouding and striation that may occur when isophorone diisocyanate is solely used may be prevented, and a mechanical strength of the optical material may be improved.

The first polymerizable compound may include both isophorone diisocyanate and hexamethylene diisocyanate, so that the optical material having improved thermal stability and mechanical properties may be achieved while suppressing the generation of striation and clouding.

In an embodiment, a content of the isophorone diisocyanate may be in a range from 30 parts by weight to 55 parts by weight based on 100 parts by weight of the first polymerizable compound and the second polymerizable compound.

For example, the content of isophorone diisocyanate may be in a range from 35 parts by weight to 50 parts by weight, preferably 40 parts by weight to 50 parts by weight based on 100 parts by weight of the first polymerizable compound and the second polymerizable compound, and more preferably from 42 parts by weight to 48 parts by weight.

In an embodiment, a content of hexamethylene diisocyanate may be in a range from 5 parts by weight to 20 parts by weight based on 100 parts by weight of the first polymerizable compound and the second polymerizable compound.

For example, the content of hexamethylene diisocyanate may be in a range from 5 parts by weight to 15 parts by weight based on 100 parts by weight of the first polymerizable compound and the second polymerizable compound, and may be in a range from 5.5 parts by weight to 14 parts by weight in an embodiment. Preferably, the content of hexamethylene diisocyanate may be in a range from 6 parts by weight to 12 parts by weight, more preferably from 6 parts by weight to 11 parts by weight based on 100 parts by weight of the first polymerizable compound and the second polymerizable compound.

Within the above ranges of each of isophorone diisocyanate and hexamethylene diisocyanate, mechanical properties and thermal stability of the optical material may be improved, and strength and thermal crack resistance may also be improved.

More preferably, the content of isophorone diisocyanate may be in a range from 42 parts by weight to 48 parts by weight, and the content of hexamethylene diisocyanate may be in a range from 6 parts by weight to 11 parts by weight based on 100 parts by weight of the first polymerizable compound and the second polymerizable compound Within the above range, heat resistance and mechanical properties of the optical material may be further improved while providing high storage modulus. Further, yellowing or clouding of the optical material may be suppressed, so that uniform and improved optical properties may be provided.

In some embodiments, a weight ratio of isophorone diisocyanate relative to hexamethylene diisocyanate may be in a range from 1 to 9.

In an embodiment, the weight ratio of isophorone diisocyanate relative to hexamethylene diisocyanate may be in a range from 2 to 8.5, preferably from 2.5 to 8, and more preferably from 3.5 to 7.5. Within the above content range, heat resistance and impact resistance may be further enhanced while maintaining improved optical properties of the optical material.

For example, if hexamethylene diisocyanate is included in an excess amount in the first polymerizable compound, structural stability and heat resistance of the optical material may be degraded. In this case, when a high-temperature process such as a hard coating or a dyeing is performed, a central portion of a lens may be deformed or cracked.

The first polymerizable compound may contains isophorone diisocyanate and hexamethylene diisocyanate within the above-described ranges of the contents and the weight ratio, and mechanical properties of the optical material may be improved, and heat resistance and thermal crack resistance may be improved.

In some embodiments, the first polymerizable compound may include an additional isocyanate compound in a range that may not degrade the combined effect of isophorone diisocyanate and hexamethylene diisocyanate. For example, the first polymerizable compound may include a cycloaliphatic isocyanate compound, and/or a straight-chain or branched aliphatic isocyanate compound different from isophorone diisocyanate and hexamethylene diisocyanate.

Examples of the alicyclic isocyanate compound include 1,2-bis(isocyanatomethyl)cyclohexane, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyl dimethylmethane isocyanate, 2,2-dimethyl dicyclohexylmethane isocyanate, norbomane diisocyanate, etc.

Examples of the linear or branched aliphatic isocyanate compound include 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undeca triisocyanate, 1,3,6-hexamethylene triisocyanate, 1,8-diisocyanate-4-isocyanatomethyloctane, bis(isocyanatoethyl)carbonate, bis(isocyanatoethyl)ether, etc.

in some embodiments, an amount of the first polymerizable compound may be in a range from 30 weight percent (wt %) to 70 wt % based on a total weight of the polymerizable composition, preferably from 40 wt % to 60 wt %, more preferably from 53 wt % to 54 wt %.

Within the above range, a polymerization reactivity of the polymerizable composition may be improved, and the cured product may have a high cross-linking density. Accordingly, an optical non-uniformity in a local area may be prevented, and the optical material may have improved thermal/mechanical stability and optical properties.

In exemplary embodiments, the second polymerizable compound may include 4-mercaptomethyl-3,6-dithia-1,8-octanedithiol and pentaerythritol tetrakis(mercaptoacetate). For example, the second polymerizable compound may be a mixture of 4-mercaptomethyl-3,6-dithia-1,8-octanedithiol and pentaerythritol tetrakis(mercaptoacetate).

Pentaerythritol tetrakis(mercaptoacetate) includes an ester group in a molecular structure thereof, so that crack resistance and impact strength of the optical material may be improved, and the optical material may have improved thermal stability. Additionally, the polymerizable composition may include pentaerythritol tetrakis(mercaptoacetate) having a tetrafunctional structure, so that the cross-linking density of the optical material may be increased.

Further, a reaction rate during the polymerization reaction may be controlled by 4-mercaptomethyl-3,6-dithia-1,8-octanedithiol, thereby reducing defects generated by polymerization failures. Accordingly, a dimensional stability of the optical material may be improved.

The second polymerizable compound may include both 4-mercaptomethyl-3,6-dithia-1,8-octanedithiol and pentaerythritol tetrakis(mercaptoacetate), so that a reaction stability of the polymerizable composition may be achieved and the optical material prepared therefrom may have improved thermal stability and mechanical properties.

In an embodiment, an amount of the 4-mercaptomethyl-3,6-dithia-1,8-octane dithiol is in a range from 30 parts by weight to 45 parts by weight based on 100 parts by weight of the first polymerizable compound and the second polymerizable compound.

For example, the amount of the 4-mercaptomethyl-3,6-dithia-1,8-octane dithiol may be in a range from 30 parts by weight to 40 parts by weight based on 100 parts by weight of the first polymerizable compound and the second polymerizable compound, preferably from 35 parts by weight to 40 parts by weight, more preferably from 37 parts by weight to 40 parts by weight.

In an embodiment, an amount of the pentaerythritol tetrakis(mercaptoacetate) may be in a range from 5 parts by weight to 20 parts by weight based on 100 parts by weight of the first polymerizable compound and the second polymerizable compound.

For example, the amount of pentaerythritol tetrakis(mercaptoacetate) may be in a range from 5 parts by weight to 15 parts by weight based on 100 parts by weight of the first polymerizable compound and the second polymerizable compound, preferably 5 parts by weight to 10 parts by weight, more preferably 6 parts by weight to 9 parts by weight.

Within the content ranges of 4-mercaptomethyl-3,6-dithia-1,8-octanedithiol and pentaerythritol tetrakis(mercaptoacetate), the polymerizable composition may have improved polymerization reactivity, and the optical material may have enhanced impact resistance and mechanical strength.

Pentaerythritol tetrakis(mercaptoacetate) may have a low compatibility with isophorone diisocyanate, and a layer separation between each component may be caused and uniformity of a mixture may be degraded. In exemplary embodiments, the contents of 4-mercaptomethyl-3,6-dithia-1,8-octanedithiol and pentaerythritol tetrakis(mercaptoacetate) are controlled within the above ranges, so that homogeneity and affinity of the mixture may be improved, and the layer separation of the polymerizable composition may be prevented.

More preferably, the amount of the 4-mercaptomethyl-3,6-dithia-1,8-octane dithiol may be in a range from 37 parts by weight to 40 parts by weight, and the amount of the pentaerythritol tetrakis(mercaptoacetate) may be in a range from 6 parts by weight to 9 parts by weight based on 100 parts by weight of the first polymerizable compound and the second polymerizable compound.

Within the above ranges, the cross-linking density of the optical material may be improved and mechanical properties may also be improved. Further, reaction stability of the composition may be achieved. Accordingly, the uniformity and dimensional stability of the optical material may be further improved, and the uniform and improved optical properties may be maintained for a long period.

In some embodiments, a weight ratio of 4-mercaptomethyl-3,6-dithia-1,8-octanedithiol relative to pentaerythritol tetrakis(mercaptoacetate) may be in a range from 1 to 7.

For example, specifically, the weight ratio of 4-mercaptomethyl-3,6-dithia-1,8-octanedithiol relative to pentaerythritol tetrakis(mercaptoacetate) may be in a range from 1 to 6, preferably from 3 to 6, more preferably from 4 to 6, or from 4.19 to 6. Within the above ranges of the weight ratio, dimensional stability and thermal properties of a polythiourethane-based compound prepared by the polymerizable composition may be improved.

For example, if pentaerythritol tetrakis(mercaptoacetate) is included in an excess amount of the second polymerizable compound, reactivity and reaction rate of the polymerizable composition may be excessively increased. In this case, the curing density and structural stability of the optical material may be reduced.

The second polymerizable compound may include 4-mercaptomethyl-3,6-dithia-1,8-octanedithiol and pentaerythritol tetrakis(mercaptoacetate) within the above ranges of the contents and weight ratio, so that the optical material having high heat resistance and impact resistance may be achieved, and transparency and refractive index of the optical material may be improved.

Further, a content of sulfur (S) in the polymerizable composition may be adjusted within a predetermined range, so that a refractive index of the optical material may be increased, and mechanical properties may be improved.

In some embodiments, the content of sulfur in the polymerizable composition may be 24% or more, for example, from 24% to 29%. The content of sulfur in the polymerizable composition may be a percentage of a total weight of sulfur atoms included in the polymerizable composition divided by a total weight of the first polymerizable compound and the second polymerizable compound.

In an embodiment, the content of sulfur in the polymerizable composition may be calculated by Equation 1 below.

$$((\text{the total weight of sulfur atoms contained in the second polymerizable compound})/(\text{the total weight of the first polymerizable compound and the second polymerizable compound}))\times 100 \quad \text{[Equation 1]}$$

For example, the content of sulfur in the polymerizable composition may be calculated by Equation 2 below.

$$S_T(\%) = \sum_{i=1}^{n} \left( \frac{32.065 \times N_i}{Mw_i} \times wt_i \right) \quad \text{[Equation 2]}$$

In Equation 2, $S_T$ is a total content of sulfur (wt %) included in the polymerizable composition, and Ni is the number of sulfur atoms included in one molecule of an i-component of the second polymerizable compound.

The "i-component" may be a term designating a compound of the same type among the second polymerizable compound. For example, a first component may be 4-mercaptomethyl-3,6-dithia-1,8-octane dithiol, and the second component may be pentaerythritol tetrakis (mercaptoacetate).

In Equation 2, n may represent the number of heterogeneous compounds included in the second polymerizable compound. For example, when the second polymerizable compound contains only 4-mercaptomethyl-3,6-dithia-1,8-octanedithiol and pentaerythritol tetrakis(mercaptoacetate), n may be 2.

Mwi is a molecular weight of the i-component of the second polymerizable compound, and wti is a content of the i-component in the polymerizable compound. For example, wti may be a percentage value obtained by dividing a weight of the i-component by the total weight of the first polymerizable compound and the second polymerizable compound.

If the content of sulfur in the polymerizable composition is 24% or more, the optical material may have a high refractive index, and a thickness of the lens may become thinner. If the content of sulfur in the polymerizable composition is 29% or less, the impact resistance and mechanical properties of the optical material may be improved.

Preferably, the content of sulfur in the polymerizable composition may be in a range from 25% to 28%, more preferably in a range from 25% to 26%.

In an embodiment, the second polymerizable compound may further include an additional polythiol compound within a range that may not degrade the combined effect of 4-mercaptomethyl-3,6-dithia-1,8-octanedithiol and pentaerythritol tetrakis (mercaptoacetate).

Examples of the additional polythiol compound include 2-(2-mercaptoethylthio)propane-1,3-dithiol, 2,3-bis(2-mercaptoethylthio)propane-1-thiol, 2-(2,3-bis(2-mercaptoethylthio)propylthio)ethanethiol, 1,2-bis(2-mercaptoethylthio)-3-mercaptopropane, 1,2-bis(2-(2-mercaptoethylthio)-3-mercaptopropylthio)-ethane, bis(2-(2-mercaptoethylthio)-3-mercaptopropyl)sulfide, 2-(2-mercaptoethylthio)-3-2-mercapto-3-[3-mercapto-2-(2-mercaptoethylthio)-propylthio]propylthio-propane-1-thiol, 2,2'-thiodiethanethiol, 4,14-bis(mercaptomethyl)-3,6,9,12,15-pentathiahexadecane-1,17-dithiol, 2-(2-mercaptoethylthio)-3-[4-(1-{4-[3-mercapto-2-(2-mercaptoethylthio)-propoxy]-phenyl}-1-methylethyl)-phenoxy]-propane-1-thiol, pentaerythritol tetrakis(3-mercaptopropionate), trimethylolpropane trismercaptopropionate, glycerol trimercaptopropionate, dipentaerythritol hexamercaptopropionate, 2,5-bis-mercaptomethyl-1,4-ditian.

In some embodiments, an amount of the second polymerizable compound may be in a range from 30 wt % to 70 wt %, preferably 40 wt % to 60 wt %, based on a total weight of the polymerizable composition.

In exemplary embodiments, a weight ratio between the first polymerizable compound and the second polymerizable compound may be from 2:8 to 8:2, preferably from 4:6 to 6:4. Within the above range, the reactivity and reaction rate may be appropriately controlled, and dimensional stability of the cured product may be improved. Further, optical non-uniformity of the cured product may be prevented, and transparency of the optical material may be enhanced.

In some embodiments, in the polymerizable composition, a (NCO)/(SH) equivalent ratio (a molar ratio of functional groups) may be in a range from 0.8 to 1.2, preferably from 0.9 to 1.1. Within the above range, unreacted compounds remaining after the curing may be suppressed. Accordingly, the cured product may have a low hygroscopicity and a low coefficient of thermal expansion, and an appropriate curing density may be maintained to have improved heat resistance and strength.

As described above, the polymerizable composition may include the first polymerizable compound including isophorone diisocyanate and hexamethylene diisocyanate, and a second polymerizable compound including 4-mercaptomethyl-3,6-dithia-1,8-octanedithiol and pentaerythritol tetrakis(mercaptoacetate). The reactivity and reaction rate between the isocyanate compound and the polythiol compound may be appropriately controlled, so that striation may be prevented through a stable polymerization reaction, and the optical material having a uniform refractive index may be obtained.

Additionally, the contents and weight ratio of the first polymerizable compound and the second polymerizable compound may be adjusted within predetermined ranges, so that the optical material prepared therefrom may have a high glass transition temperature (Tg) and an increased storage modulus. Thus, improved reliability and dimensional stability may be achieved even in a high-temperature process, and the optical material may be prevented from being deformed or damaged by heat or mechanical shock.

In some embodiments, the polymerizable composition may further include additives such as an internal release agent, a polymerization initiator, a heat stabilizer, a UV absorber and/or a blueing agent.

The internal release agent may include, e.g., a fluorine-based non-ionic surfactant having a perfluoroalkyl group, a hydroxyalkyl group or a phosphoric acid ester group; a silicone-based non-ionic surfactant having a dimethylpoly-siloxane group, a hydroxyalkyl group or a phosphoric acid ester group; an alkyl quaternary ammonium salts such as a trimethylcetyl ammonium salt, a trimethylstearyl ammonium salt, a dimethylethylcetyl ammonium salt, a triethyl-dodecyl ammonium salt, a trioctylmethyl ammonium salt, a diethylcyclohexadodecyl ammonium salt, etc.; an acidic phosphate ester, or the like. These may be used alone or in combination of two or more therefrom.

In some embodiments, a content of the internal release agent may be in a range from 500 ppm to 1,500 ppm, preferably 600 ppm to 1,000 ppm based on the total weight of the polymerizable composition. Within the above range, a release of the optical material may be easily performed, and an appearance property of the optical lens may be improved.

The polymerization initiator may include a catalyst used for a polymerization of a polythiourethane-based resin. For example, a dialkyl tin halide-based catalyst such as dibutyl tin dichionde, dimethyl tin dichloride, etc.; a dialkyl tin dicarboxylate catalyst such as dimethyl tin diacetate, dibutyl tin dioctanoate, dibutyl tin dilaurate, etc.; a dialkyl tin dialkoxide catalyst such as dibutyltin dibutoxide, dioctyltin dibutoxide, etc.; a dialkyl tin dithio alkoxide catalyst such as dibutyltin di(thiobutoxide); a dialkyl tin oxide catalyst such as di(2-ethylhexyl)tin oxide, dioctyl tin oxide, bis(butoxy-dibutyl tin)oxide, etc.; a dialkyl tin sulfide-based catalyst, or the like. These may be used alone or in combination of two or more therefrom.

In some embodiments, a content of the polymerization initiator may be in a range from 500 ppm to 3,000 ppm, preferably 1,000 ppm to 2,500 ppm, based on the total weight of the polymerizable composition. Within the above range, the polymerization reactivity and reaction rate of the polymerizable composition may be appropriately adjusted, and the polymerizable composition may have improved time-dependent stability.

For example, the dialkyl tin halide-based catalyst, etc., may serve as a positive catalyst when reacting with 4-mer-captomethyl-3,6-dithia-1,8-octanedithiol, and may serve as a negative catalyst when reacting with pentaerythritol tet-rakis(mercaptoacetate). Thus, within the above range of the content of the polymerization initiator, reactivities of pen-taerythritol tetrakis(mercaptoacetate) and 4-mercaptom-ethyl-3,6-dithia-1,8-octanedithiol may be balanced.

The heat stabilizer may include, e.g., a metal fatty acid salt-based compound, a phosphorus-based compound, a lead-based compound or an organotin-based compound. These may be used alone or in combination of two or more therefrom.

The ultraviolet absorber may include, e.g., a benzophe-none-based compound, a benzotriazole-based compound, a salicylate-based compound, a cyanoacrylate-based compound or an oxanilide-based compound. These may be used alone or in combination of two or more therefrom The bluing agent may be included as a color control agent of the optical material prepared from the polythiourethane resin. For example, the bluing agent may have an absorption band in a wavelength band from orange to yellow in a visible light region.

The bluing agent may include, e.g., a dye, a fluorescent brightener, a fluorescent pigment, an inorganic pigment, etc., and may be selected in consideration of physical properties or a resin color required for an optical product to be manufactured. If the dye is used as the bluing agent, a dye having a maximum absorption wavelength, e.g., in a range from 520 nm to 600 nm, preferably from 540 nm to 580 nm may be used. Preferably, an anthraquinone-based dye may be used.

In some embodiments, the additives may be included in an amount from 0.01 wt % to 5 wt % based on the total weight of the polymerizable composition.

<Optical Material>

According to exemplary embodiments, an optical material prepared using the above-described polymerizable composition may be provided. For example, the optical material may include a cured product of the above-described polymerizable composition. For example, the optical material may include a polythiourethane resin produced through a polymerization reaction of the first polymerizable compound and the second polymerizable compound included in the polymerizable composition.

For example, the polymerizable composition may be degassed under reduced pressure, and then filtered and injected into a mold for molding the optical material. The mold injection may be performed at a temperature, e.g., ranging from 10° C. to 40° C.

After the mold injection, the polymerization reaction may proceed by gradually increasing a temperature. The temperature of the polymerization reaction may be, e.g., from 5° C. to 200° C., preferably from 10° C. to 150° C., more preferably from 25° C. to 125° C.

For example, a maximum polymerization temperature may be in a range from 100° C. to 150° C. preferably from 110° C. to 140° C., more preferably 115° C. to 130° C.

A temperature increasing rate may be in a range from 1° C./min to 10° C./min, preferably from 3° C./min to 8° C./min, more preferably 4° C./min to 7° C./min. A polymerization time may be in a range from 10 hours to 20 hours, preferably from 15 hours to 20 hours.

Within the above temperature range, a lens having uniform optical and mechanical properties may be easily obtained by appropriately controlling a reaction rate.

After the polymerization, a polymerized polythiourethane resin may be separated from the mold to obtain the optical material.

In an embodiment, a curing process may be further performed after separating or releasing the optical material from the mold. The temperature of the curing process may be in a range from 110° C. to 150° C., preferably from 110° C. to 140° C., more preferably from 115° C. to 130° C. The curing process may be performed for 0.5 hours to 10 hours, preferably 1 hour to 8 hours, more preferably 2 hours to 6 hours.

In some embodiments, the optical material may be an optical lens, e.g., a plastic optical lens. The optical material may be fabricated in the form of a spectacle lens, a camera lens, a light emitting diode, etc. according to a mold shape used in manufacturing the optical material, and a central thickness and a diameter may be variously adjusted according to a use of the optical material.

The optical lens may be subjected to a surface treatment from, e.g., an anti-reflection, a hardness enhancement, an abrasion resistance improvement, a chemical resistance improvement, an anti-fogging, a surface polishing for coloring, an anti-static treatment, a hard coat treatment, an anti-reflection coating treatment, a dyeing treatment, etc.

As described above, the polymerizable composition may include the first polymerizable compound including iso-phorone diisocyanate and hexamethylene diisocyanate, and the second polymerizable compound including 4-mercaptomethyl-3,6-dithia-1,8-octanedithiol and pentaerythritol tetrakis(mercaptoacetate). Thus, mechanical/structural stability of the polythiourethane resin prepared from the polymerizable composition may be achieved secured, and optical properties may be improved.

For example, the types and/or content ratios of each of the first polymerizable compound and the second polymerizable compound may be adjusted as described above, so that the optical material having improved refractive index, heat resistance and impact resistance may be provided.

In some embodiments, a solid-state refractive index (nd20) of the optical material may be in a range from 1.59 to 1.61. For example, the solid-state refractive index of the optical material may be measured using an Abbe refractometer at a temperature of 20° C. Preferably, the solid-state refractive index at 20° C. of the optical material may be in a range from 1.59 to 1.60, more preferably in a range from 1.595 to 1.599. The optical material may have a high refractive index within the above range, the thickness of the optical lens may be reduced, and the optical material may have, e.g., properties of low light dispersion and low chromatic aberration.

In some embodiments, a glass transition temperature (Tg) of the optical material may be in a range from 105° C. to 120° C. For example, the glass transition temperature may be measured using the optical material at a temperature increasing rate of 10° C./min. Within the above range of the glass transition temperature (Tg) of the optical material, reliability may be maintained even in high-temperature processes such as hard coating and dyeing, and deterioration of the optical properties due to deformation of the lens may be prevented when being used even under high-temperature conditions.

Preferably, the glass transition temperature of the optical material may be in a range from 105° C. to 113° C., more preferably from 105° C. to 110° C. Within the above range, moldability and processability may be improved while maintaining enhanced stability of the optical material.

In some embodiments, a storage modulus of the optical material may be in a range from 3.0 GPa to 4.0 GPa, preferably from 3.5 GPa to 4.0 GPa. For example, the storage modulus may be measured by a 3-point bending method (temperature increasing rate of 2° C./min) using a thermomechanical analyzer (TMA) for an optical material at room temperature (25° C.). Within the range of the storage modulus of the optical material at room temperature, deformation may be suppressed, dimensional stability may be increased, and viscoelasticity and durability may be enhanced.

In some embodiments, a coefficient of thermal expansion (CTE) of the optical material may be 78 $\mu$m/m·° C. or less. For example, the optical material may have a coefficient of thermal expansion in range from 70 $\mu$m/m·° C. to 78 $\mu$m/m·° C., preferably from 74 $\mu$m/m ° C. to 78 $\mu$m/m·° C. The coefficient of thermal expansion may be measured using a thermomechanical analyzer (TMA) with a load of 50 g and a heating rate of 10° C./min. Specifically, the coefficient of thermal expansion may be measured using a penetration method under conditions of the load of 50 g, a pin wire of 0.5 mm$\Phi$, and the heating of 10° C./min.

Within the above range, heat resistance of the optical material may be improved, and deformation and distortion of the optical material due to high temperature may be prevented. Accordingly, damages of the cured product may be suppressed even in a high-temperature process, and the optical material may have improved dimensional stability.

In some embodiments, the optical material may have a transmittance of 80% or more with respect to a light having a wavelength of 550 nm, preferably 90% or more. For example, the transmittance may be measured by transmitting light having the wavelength of 550 nm in a thickness direction with respect to the optical material having a thickness of 2 mm.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

(1) Example 1

Preparation of Polymerizable Composition 42.57 parts by weight of isophorone diisocyanate and 10.74 parts by weight of hexamethylene diisocyanate as a first polymerizable compound were prepared, and 37.69 parts by weight 4-mercaptomethyl-3,6-dithia-1,8-octanedithiol and 9.00 parts by weight of pentaerythritol tetrakis (mercaptoacetate) were prepared as a second polymerizable compound. The first and second polymerizable compounds were uniformly mixed. Thereafter, 0.2 parts by weight of dimethyl tin dichloride as a polymerization initiator and 0.07 parts by weight of a phosphoric acid ester-based internal release agent manufactured by ZELEC® UN Stepan as an internal release agent were added and uniformly mixed to prepare a polymerizable composition.

Fabrication of Optical Material

The polymerizable composition was subjected to a defoaming process at 600 Pa for 1 hour. Thereafter, the polymerizable composition filtered through a 3 $\mu$m Teflon filter was injected into a mold including a glass mold and a tape. A polymerization was conducted by slowly raising a temperature of the mold at a constant rate from 10° C. to 130° C. for 24 hours. After the polymerization, the mold was separated and further cured at 130° C. for 2 hours to prepare a lens sample in a circular shape with a thickness of 2 mm and a diameter of 75 mm (−3.00D).

(2) Examples 2 to 9 and Comparative Examples 1 and 2

Lens samples were prepared by the same method as that in Example 1, except that components and contents of the first polymerizable compound, the second polymerizable compound and additive were modified as shown in Table 1 below.

TABLE 1

| No. | first polymerizable compound (A) | | second polymerizable compound (B) | | polymerization initiator (C) | internal release agent (D) |
|---|---|---|---|---|---|---|
| | parts by weight | weight ratio | parts by weight | weight ratio | | |
| Example 1 | 42.57(A-1) | 3.96 | 37.69(B-1) | 4.19 | 0.2 | 0.07 |
| | 10.74(A-2) | 1 | 9.00(B-2) | 1 | (C-1) | |
| Example 2 | 47.59(A-1) | 7.49 | 37.18(B-1) | 4.19 | 0.2 | 0.07 |
| | 6.35(A-2) | 1 | 8.88(B-2) | 1 | (C-1) | |
| Example 3 | 40.26(A-1) | 3.08 | 39.99(B-1) | 5.98 | 0.2 | 0.07 |
| | 13.06(A-2) | 1 | 6.69(B-2) | 1 | (C-1) | |
| Example 4 | 34.34(A-1) | 1.98 | 39.61(B-1) | 4.54 | 0.2 | 0.07 |
| | 17.32(A-2) | 1 | 8.73 (B-2) | 1 | (C-1) | |
| Example 5 | 36.66(A-1) | 2.45 | 40.26(B-1) | 4.95 | 0.2 | 0.07 |
| | 14.94(A-2) | 1 | 8.14(B-2) | 1 | (C-1) | |
| Example 6 | 39.34(A-1) | 3.08 | 41.04(B-1) | 5.98 | 0.2 | 0.07 |
| | 12.76(A-2) | 1 | 6.86(B-2) | 1 | (C-1) | |
| Example 7 | 44.75(A-1) | 5.29 | 34.96(B-1) | 2.96 | 0.2 | 0.07 |
| | 8.46(A-2) | 1 | 11.83(B-2) | 1 | (C-1) | |
| Example 8 | 45.59(A-1) | 5.29 | 40.96(B-1) | 8.50 | 0.2 | 0.07 |
| | 8.62(A-2) | 1 | 4.82(B-2) | 1 | (C-1) | |
| Example 9 | 50.05(A-1) | 4.21 | 36.9(B-1) | 4.18 | 0.2 | 0.07 |
| | 4.21(A-2) | 1 | 8.82(B-2) | 1 | (C-1) | |
| Comparative Example 1 | 50.4(A-3) | — | 25.5(B-1) | 1.07 | 0.2 | 0.1 |
| | | | 23.9(B-3) | 1 | (C-2) | |
| Comparative Example 2 | 48.5(A-4) | — | 26.5(B-4) | 0.98 | 0.2 | 0.1 |
| | | | 27.0(B-2) | 1 | (C-2) | |

Specific compounds designated in Table 1 above are as follows

First Polymerizable Compound (A)
1) A-1: isophorone diisocyanate
2) A-2: hexamethylene diisocyanate
3) A-3: norbornane diisocyanate
4) A-4: 1,3-bis(isocyanatomethyl) cyclohexane Second Polymerizable Compound (B)
1) B-1: 4-mercaptomethyl-3,6-dithia-1,8-octane dithiol
2) B-2: pentaerythritol tetrakis(mercaptoacetate)
3) B-3: pentaerythritol tetrakis(mercaptopropionate)
4) B-4: 2,5-bis(mercaptomethyl)-1,4-dithiane Polymerization Initiator (C)
1) C-1: dimethyl tin dichloride
2) C-2: dibutyl tin dichloride Internal Release Agent (D)
Phosphoric acid ester-based internal release agent (manufactured by ZELEC®, UN Stepan)

Experimental Example (1) Measurement of Sulfur Content

Contents of sulfur in the polymerizable compositions according to Examples and Comparative Examples were calculated as a percentage of a total weight of sulfur atoms based on a total weight of the polymerizable compounds.

Specifically, the sulfur contents of the polymerizable compositions according to Examples were calculated by Equation 3 below.

$$\text{Sulfur content}(\%) = ((B\text{-}1 \text{ parts by weight} \times 0.6154) + (B\text{-}2 \text{ parts by weight} \times 0.2872)) / (A \text{ parts by weight} + B \text{ parts by weight}) \times 100 \qquad \text{[Equation 3]}$$

The sulfur content of the polymerizable compositions according to Comparative Example 1 and Comparative Example 2 were calculated by Equations 4 and 5, respectively.

$$\text{Sulfur content}(\%) = ((B\text{-}1 \text{ parts by weight} \times 0.6154) + (B\text{-}3 \text{ parts by weight} \times 0.2625)) / (A \text{ parts by weight} + B \text{ parts by weight}) \times 100 \qquad \text{[Equation 4]}$$

$$\text{Sulfur content}(\%) = ((B\text{-}4 \text{ parts by weight} \times 0.6038) + (B\text{-}2 \text{ parts by weight} \times 0.2872)) / (A \text{ parts by weight} + B \text{ parts by weight}) \times 100 \qquad \text{[Equation 5]}$$

(2) Measurement of Solid-State Refractive Index

A solid-state refractive index (nd20) of each lens sample of Examples and Comparative Examples was measured at 20° C. using an Abbe refractometer (DR-M4).

(3) Measurement of Yellow Index (Y.I.)

Lens samples of Examples and Comparative Examples were prepared in the form of a plastic cylinder (r (radius)×H (height)=16 mm×45 mm). A yellow index (YI) was measured by transmitting a light in a height direction of the plastic cylinder using a UV/VIS spectroscopy (PerkinElmer, UV/VIS Lambda 365) based on ASTM E313 standards.

(4) Measurement of Transmittance

For each lens sample of Examples and Comparative Examples, a transmittance was measured by transmitting a light of a wavelength of 550 nm in the thickness direction using the UVNS Spectroscopy (PerkinElmer, UV/VIS Lambda 365).

(5) Measurement of Glass Transition Temperature (Tg)

For each lens sample of Examples and Comparative Examples, a glass transition temperature (Tg) was measured in an interval of 20° C. to 250° C. at a temperature increasing rate of 10° C./min using a DSC (DSC250, TA instruments).

(6) Measurement of Storage Modulus (E')

For each lens sample of Examples and Comparative Examples, a storage modulus (E) at 25° C. was measured based on a three-point bending test (temperature increasing rate of 2° C./min) using a thermomechanical analyzer (DMA Q800, TA instruments).

(7) Measurement of Coefficient of Thermal Expansion (CTE)

For each lens sample of Examples and Comparative Examples, a coefficient of thermal expansion before the glass transition temperature (Tg) was measured by a penetration method (50 g load, pin wire 0.5 mmΦ, temperature increasing rate 10° C./min) using a thermomechanical analyzer (TMA Q400, TA instruments).

(8) Measurement of Heat-Resistant Crack

A silicone-based hard coating solution was coated on each lens sample of Examples and Comparative Examples, and then heated at 100° C. to 120° C. for 30 minutes to 120 minutes. Subsequently, the sample was cooled to 20° C., and then heated again. Specifically, the sample was heated from 20° C. for every 10 minutes when a temperature was increased by 5° C. and cooled for 30 minutes. A heat-resistant crack was evaluated by measuring a temperature when a crack was initially detected on a surface of the sample while repeating the heating and cooling to 200° C.

(9) Evaluation on Impact Resistance (Drop-Ball Test)

An impact resistance of each lens sample of Examples and Comparative Examples was evaluated according to US FDA standards (ANSI Z80.1-410.FDA. Sec 801410). Specifically, a 16 g steel ball was dropped from a height of 127 cm to the lens sample, and damages such including breakage or cracks were detected. The evaluation standard are as follows.

◯: No breakage or cracks detected x: Breakage or cracks were detected

(10) Measurement of Static Load Property

The lens samples of Examples and Comparative Examples were subjected to a static load for 100N/10 sec according to an ISO 14889:2003 test method to detect whether the lens samples were damaged. The evaluation standard are as follows.

◯: No Breakage detected x: Breakage was detected

(11) Evaluation on Striation

A mercury lamp light source was irradiated through each lens samples of Examples and Comparative Examples. A transmitted light was projected on a white plate to determine whether striation occurred by a presence or an absence of contrast. The evaluation standard are as follows.

A: No striation occurred

B: Striation was detected beyond 30 mm from a center of the lens sample

C: Striation was detected within 30 mm from a center of the lens sample

(12) Evaluation on Clouding

A mercury lamp light source was irradiated through each lens samples of Examples and Comparative Examples, and a generation of clouding was determined using a scattered light detected by naked eyes. The evaluation standards are as follows.

A: No clouding detected

B: Clouding was detected beyond 30 mm from a center of the lens sample

C: Clouding was detected within 30 mm from a center of the lens sample

The results are shown in Tables 2 and 3 below.

TABLE 2

|  | Example 1 | Example 2 | Example 3 | Example 4 | Example 5 |
|---|---|---|---|---|---|
| Sulfur Content (%) | 25.78 | 25.43 | 26.53 | 26.88 | 27.11 |
| Refractive Index | 1.5959 | 1.5938 | 1.5994 | 1.6038 | 1.5998 |
| Yellow Index (Y.I) | 1.0 | 1.0 | 0.9 | 0.9 | 1.0 |
| Transmittance (%) | 90 | 90 | 90 | 90 | 90 |
| Glass transition temperature (° C.) | 105 | 107 | 111 | 106 | 112 |
| Storage Modulus (GPa) | 3.8 | 3.9 | 3.5 | 3.7 | 3.4 |
| Coefficient of thermal expansion (μm/m · ° C.) | 78 | 74 | 75 | 74 | 76 |
| Heat-resistant Crack (° C.) | 130 | 130 | 120 | 130 | 120 |
| Impact Resistance | ◯ | ◯ | ◯ | ◯ | ◯ |
| Static Load Properly | ◯ | ◯ | ◯ | ◯ | ◯ |
| Striation | A | A | A | C | A |
| Clouding | A | A | B | A | B |

TABLE 3

|  | Example 6 | Example 7 | Example 8 | Example 9 | Comparative Example 1 | Comparative Example 2 |
|---|---|---|---|---|---|---|
| Sulfur Content (%) | 27.23 | 24.91 | 26.59 | 25.25 | 22.01 | 23.29 |
| Refractive Index | 1.6003 | 1.5906 | 1.5961 | 1.592 | 1.5987 | 1.5986 |
| Yellow Index (Y.I) | 0.9 | 0.8 | 0.9 | 0.8 | 1.1 | 0.8 |
| Transmittance (%) | 90 | 90 | 90 | 90 | 90 | 90 |
| Glass transition temperature (° C.) | 113 | 118 | 124 | 125 | 114 | 118 |
| Storage Modulus (GPa) | 3.4 | 3.8 | 3.5 | 3.9 | 3.0 | 3.2 |
| Coefficient of thermal expansion (μm/m · ° C.) | 75 | 70 | 79 | 77 | 79 | 64 |
| Heat-resistant Crack (° C.) | 120 | 120 | 110 | 110 | 110 | 110 |
| Impact Resistance | ◯ | ◯ | ◯ | x | ◯ | ◯ |
| Static Load Property | ◯ | ◯ | ◯ | x | ◯ | ◯ |
| Striation | B | B | C | C | A | B |
| Clouding | B | B | A | A | A | A |

Referring to Tables 2 and 3, when the polymerizable composition did not include the first polymerizable compound and the second polymerizable compound as the polymerizable compound, mechanical properties and thermal stability of the optical lens were deteriorated.

the optical lenses prepared from the polymerizable composition according to exemplary embodiments provide improved thermal stability and mechanical properties while having improve optical properties.

The optical lenses of Comparative Examples had low storage modulus and degraded thermal crack resistance.

What is claimed is:

1. A polymerizable composition, comprising:
a first polymerizable compound comprising isophorone diisocyanate and hexamethylene diisocyanate; and
a second polymerizable compound comprising 4-mercaptomethyl-3,6-dithia-1,8-octanedithiol and pentaerythritol tetrakis(mercaptoacetate),
wherein a weight ratio of the isophorone diisocyanate relative to hexamethylene diisocyanate is in a range from 1 to 9, and
wherein an amount of 4-mercaptomethyl-3,6-dithia-1,8-octanedithiol is in a range from 30 parts by weight to 45 parts by weight, and an amount of pentaerythritol tetrakis(mercaptoacetate) is in a range from 6.69 parts by weight to 20 parts by weight, based on 100 parts by weight of the first polymerizable compound and the second polymerizable compound.

2. The polymerizable composition according to claim 1, wherein an amount of isophorone diisocyanate is in a range from 30 parts by weight to 55 parts by weight, and an amount of hexamethylene diisocyanate is in a range from 5 parts by weight to 20 parts by weight, based on 100 parts by weight of the first polymerizable compound and the second polymerizable compound.

3. The polymerizable composition according to claim 1, wherein a weight ratio of 4-mercaptomethyl-3,6-dithia-1,8- octanedithiol relative to pentaerythritol tetrakis(mercaptoacetate) is in a range from 1.5 to 6.

4. The polymerizable composition according to claim 1, wherein a content of sulfur represented by Equation 1 is 24% or more:

$$((\text{a total weight of sulfur atoms contained in the second polymerizable compound})/(\text{a total weight of the first polymerizable compound and the second polymerizable compound}))\times100. \qquad [\text{Equation 1}]$$

5. The polymerizable composition according to claim 1, further comprising at least one selected from the group consisting of an internal release agent, a polymerization initiator, a heat stabilizer, an ultraviolet absorber and a blueing agent.

6. The polymerizable composition according to claim 5, wherein the content of the polymerization initiator is in a range from 500 ppm to 3,000 ppm based on a total weight of the polymerizable composition.

7. The polymerizable composition according to claim 5, wherein a content of the internal release agent is in a range from 500 ppm to 1,500 ppm based on the total weight of the polymerizable composition.

8. An optical material comprising a polythiourethane resin prepared from the polymerizable composition of claim 1.

9. The optical material according to claim 8, wherein a solid-state refractive index (nd20) at 20° C. is in a range from 1.59 to 1.61.

10. The optical material according to claim 8, wherein a glass transition temperature (Tg) is a range from 105° C. and 120° C.

11. The optical material according to claim 8, wherein a coefficient of thermal expansion (CTE) measured at a heating rate of 10° C./min using a thermomechanical analyzer (TMA) is 78 μm/m·° C. or less.

12. The optical material according to claim 8, wherein a storage modulus at 25° C. is in a range from of 3.0 GPa to 4.0 GPa.

* * * * *